Nov. 5, 1963 W. F. MINARD 3,109,922
SELECTIVE CONTROL APPARATUS FOR ELECTRICAL READ-IN
Filed Nov. 30, 1959 4 Sheets-Sheet 2

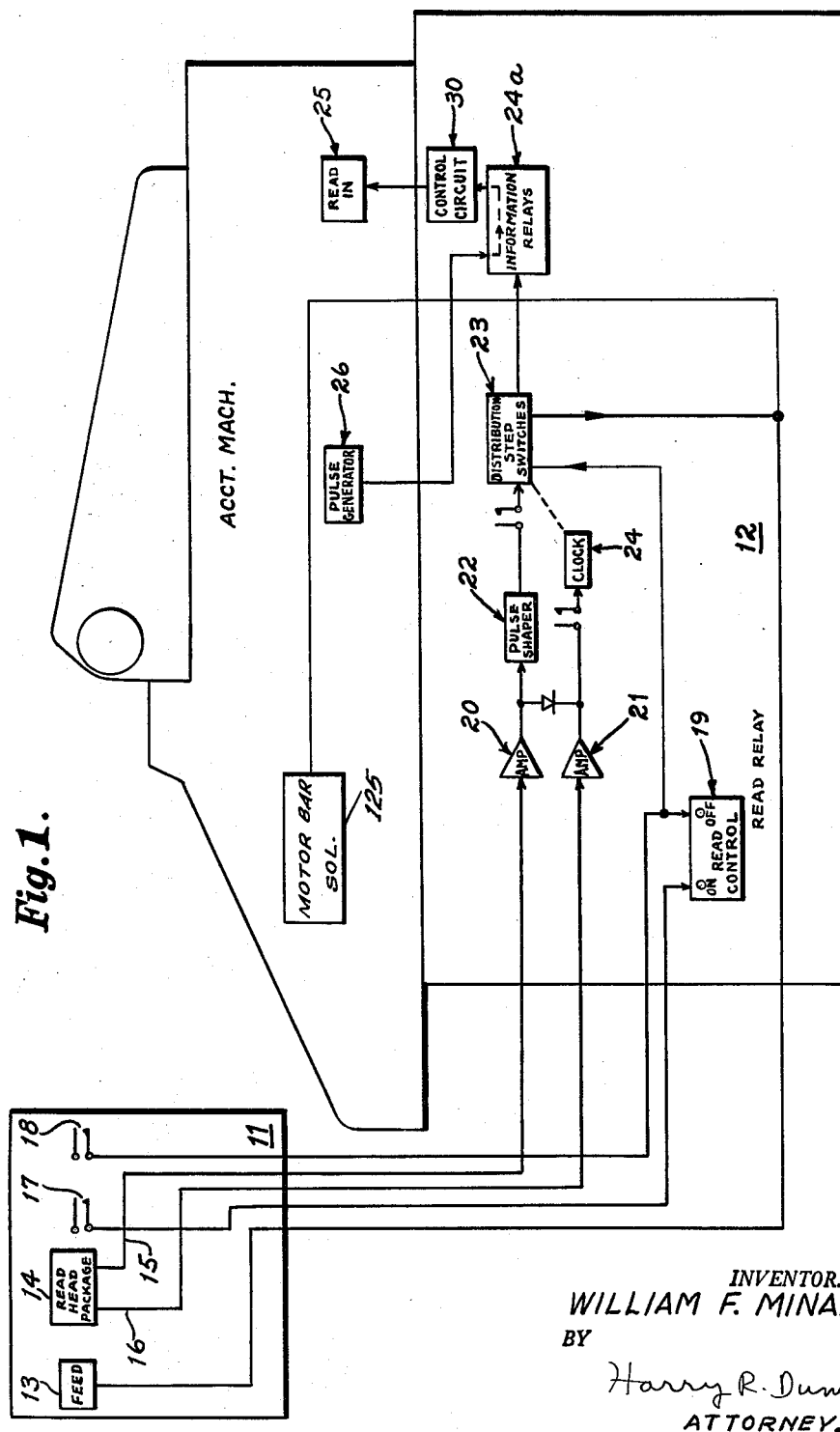

INVENTOR.
WILLIAM F. MINARD.
BY
Harry R. Dumont
ATTORNEY.

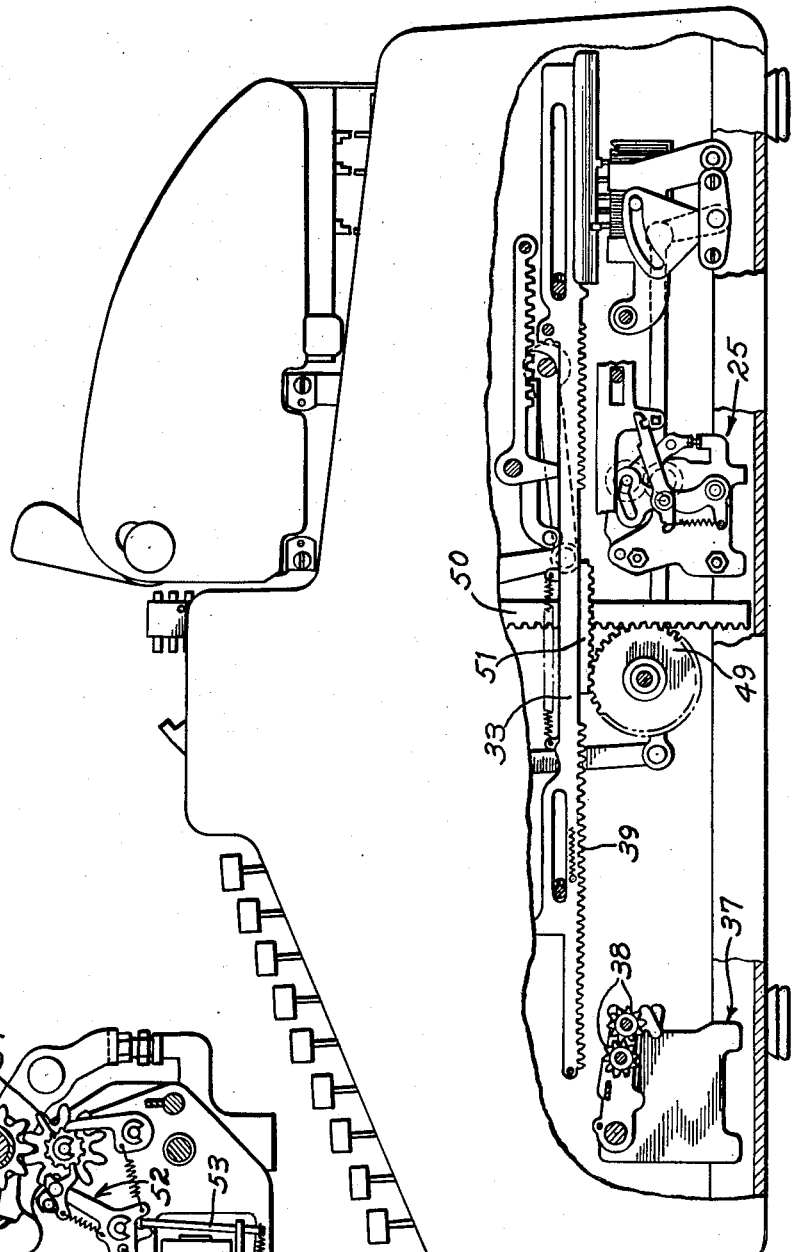
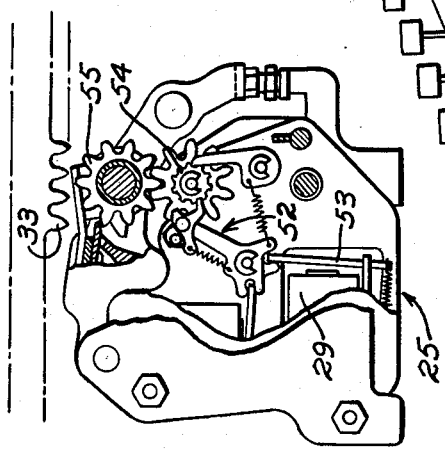

United States Patent Office 3,109,922
Patented Nov. 5, 1963

3,109,922
SELECTIVE CONTROL APPARATUS FOR
ELECTRICAL READ-IN
William F. Minard, Plymouth, Mich., assignor to Burroughs Corporation, Detroit, Mich., a corporation of Michigan
Filed Nov. 30, 1959, Ser. No. 856,169
4 Claims. (Cl. 235—61.6)

This invention relates generally to data processing accounting systems and more particularly to electrical apparatus for selective control of electrical read-in of information therein.

It is an object of the invention to provide an electrical apparatus to permit selective separate read-in of balances in an accounting machine from a recorded plurality of balances on a coded document.

It is a further object of the invention to provide an electrical apparatus to permit selective separate read-in of balances of different classifications or designations in an accounting machine from a recorded plurality of such balances on a coded document without increasing the physical or electrical size and capacity of the accumulator and read-in unit normally employed for storage of balances of only one of said classifications or designations.

It is an additional object to provide an electrical apparatus for making selective read-in of balances from a plurality of balances on a coded document, either separately or together.

In conformance with the foregoing objects and first briefly described, the invention is utilized in the combination of an automatic feeding and reading mechanism which advances a document and senses codal representations thereon and an accounting machine which receives electrical impulses derived from the codal representations, amplifies and shapes the pulses, and temporarily stores them. An electrical control apparatus is employed to selectively direct the stored electrical pulses into the read-in unit of the accounting machine which will then transfer the digits represented into desired data rack and accumulator columnar positions.

Various other objects, advantages, and meritorious features will become more fully apparent from the following specification, appended claims, and accompanying drawings wherein:

FIG. 1 is a functional block diagram illustrating the general organization and the sequence of operations performed by the form feeder and magnetic code reader apparatus coupled to the automatic accounting apparatus;

FIG. 4 is a right side elevation of the accounting machine with parts broken away showing the accumulator, a data rack, portions of a read-in unit, and associated mechanism;

FIG. 5 is a fragmentary view of the rotary read-in unit 25 showing the detail of a read-in unit 25.

Figure 2A:
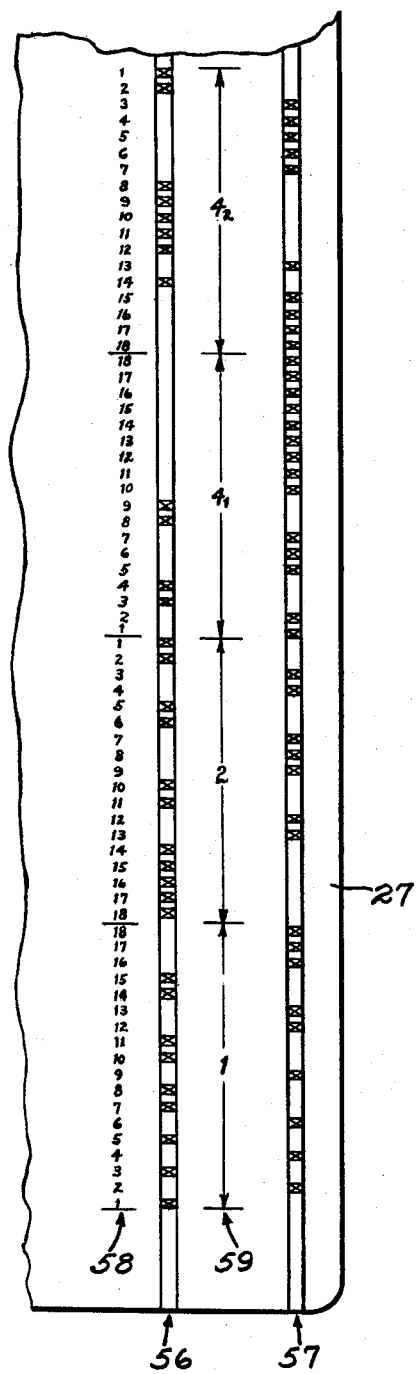
FIG. 2a shows a magnetic tape memory provided on the document and illustrates the disposition of magnetic pulse bits of encoded information thereon.

In order to fully comprehend the significant features of the instant invention, it will be helpful to describe one environment in which it may be utilized. The present invention is shown in a data processing accounting system which includes an automatic sheet feeding apparatus of the type disclosed in U.S. patent application Serial Number 685,197, filed September 20, 1957, for Roy L. Phelan, now U.S. Patent No. 2,972,444, and in conjunction with an automatic accounting machine of the automatic old balance pick-up type such as the F4200 Type currently manufactured and sold by the Burroughs Corporation.

A machine of this character is described in U.S. patent application Serial Number 598,454, filed July 17, 1956, for W. W. Deighton et al. and employs the basic accounting machine structure disclosed in full detail in U.S. Patent 2,629,549, issued on February 24, 1953, to Thomas M. Butler. A form of rotary read-in device with which the selective read-in control apparatus of the present invention may be utilized is described and claimed in U.S. patent application Number 685,240, now U.S. Patent No. 3,009,635, filed September 29, 1957, for W. W. Deighton. All the above mentioned applications and patents are of common ownership herewith.

Referring now more particularly to the drawings and with reference to FIG. 1, the numeral 11 designates a read and feed mechanism of the type described in the aforementioned Phelan application. The numeral 12 indicates an electronic accounting machine of the type described in the aforementioned Deighton application which is electrically interconnected with the read and feed mechanism 11. The reader and feeder includes a feed unit 13 which separates and feeds, one at a time, the sources of information pulses shown as documents having a magnetically encoded balance thereon. The read head package 14 reads the magnetically encoded information on the data and complement lines of the document 27, which will be more fully explained in connection with FIG. 2a, and transmits electrical pulses to the accounting machine 12 through leads 15 and 16. Also included are start-read switch 17 and finish-read switch 18 which control the reading of the document and are connected to a read control relay 19 in the accounting machine 12. An electronic pulse amplifier 20 is provided for data pulses received through lead 15 and an electronic pulse amplifier 21 is provided for complement pulses received through lead 16. In addition the data pulses are shaped in a pulse shaping unit 22 and pass through the switching section of a series of distribution step switches as indicated by numeral 23. These stepping switches are of the type described in U.S. patent application Serial Number 492,247, filed March 4, 1955, now U.S. Patent No. 2,906,838, for W. W. Deighton and of common ownership herewith.

Complement pulses pass through amplifier 21 to a clock or synchronizing element 24 of the control system and are fed with the data pulses, which are supplied from a branch circuit between data pulse amplifier 20 and pulse shaper 21 to the clock, to advance the stepping switches 23 in such a manner that they serve as a checking circuit to determine whether a predetermined number of pulses have been received from a document fed past the reading head 14. In the event an incorrect number of pulses, that is, a number other than the predetermined total of pulses, have been received from the magnetic reading head 14, the stepping switches will not be reset, the accounting machine will not be cycled and a subsequent document will not be fed from the feeder 11, as described in U.S. Patent 2,972,444. The electrical pulses representing magnetic information data code bits are distributed by the stepping switches to a pulse storing means or information relay storage unit 24a as described and shown in the aforementioned patent application Serial Number 685,197 or application S.N. 685,240, depending upon the form of stripe encoding employed. If the stepper switches have been advanced through their range of operation and reset to their home position, a pulse or control signal, which is derived from the operation of the rear paper switch 18 upon the passage of the trailing edge of the document fed thereby, is supplied through a circuit completed through the reset stepping switches to a motor bar solenoid 125, which controls the cycling of the accounting machine, and also to the feed control unit 13 of the feeder 11, thereby to initiate an automatic machine cycle of the accounting machine for entry of the data into the accumulator thereof and to initiate an automatic feed cycle of the feeder 11 to feed a subsequent document past the read head package 14 therein, all as disclosed in U.S. Patent 2,972,444. A read-in unit 25 and pulse generator 26, synchronized with movement of the data racks, is used to transfer the balance information read from the document into data racks 33 of the basic accounting machine for storage in an accumulator 37 with provisions for printing if programmed. The form of pulse generator 26, which is associated with the read-in unit 25 illustrated in FIGS. 4 and 5 and used with the specific form of document stripe encoding of FIG. 2a herein, operates in synchronism with movements of the stepping switches 23, and is more fully described in the aforementioned patent application Serial Number 685,240. So far as the multiple balance selective control apparatus of FIG. 3 of the present invention is concerned, however, it may be used with either form of document stripe encoding and read-in apparatus of U.S. Patent 2,972,444 or application S.N. 685,240.

FIG. 2a shows the magnetic tape as encoded on the document or card 27 of the type disclosed in application S.N. 685,240 and being processed by the read and feed mechanism 11. Two stripes of magnetizable material are shown—the data stripe 56 and the complement stripe 57. It will be noted that each document bears a total of 72 bits of information disposed in different positions or locations along the length of the two stripes and that the stripes are divided into 4 zones, each containing a total of 18 pulse positions and of different bit values, i.e. 1, 2, $4_1$ and $4_2$ as shown. The 18 pulse positions of the 4 zones collectively represent a storage capacity of 18 columns of information or decimal digits, the decimal value of each of which columns or digits is determined by summing the values of the data bits of the same pulse or column position of each of the 4 zones. Normally only one balance is recorded on the stripes, but in the utilization of the selective control apparatus of FIG. 3 of the present invention, the information on the stripes may represent two balances of different classifications or designations, as loan and share balances, for example, both contained on the same document. Balance #1 is carried on the first seven pulse or column positions 1–7 of each zone and Balance #2 is carried on positions 8–14 as numbered in column 58. Pulse position or column 15 is reserved for encoding a plus or minus sign and positions or columns 16–18 represent the account number. The code is of a modified binary type using a 1, 2, $4_1$, $4_2$ base as indicated in column 59. The manner in which it operates is explained in terms of Balance #1 which is indicated numerically on tape 62 in FIG. 2b. For the first digit bits are shown in pulse position or column 1 on data stripe 56 in the $4_2$, 2 and 1 zones as indicated in column 59. Therefore the first digit is a seven. For the second digit, data bits are shown on data stripe 56 in the $4_2$ and 2 zones as indicated in column 59. Therefore the second digit is a six. In a like manner the remaining digits in Balances #1 and #2 may be determined. In order to retain the predetermined check number of 72 digits, a bit is magnetized on the complement stripe wherever no bit is magnetized on the data stripe.

Figure 2B:
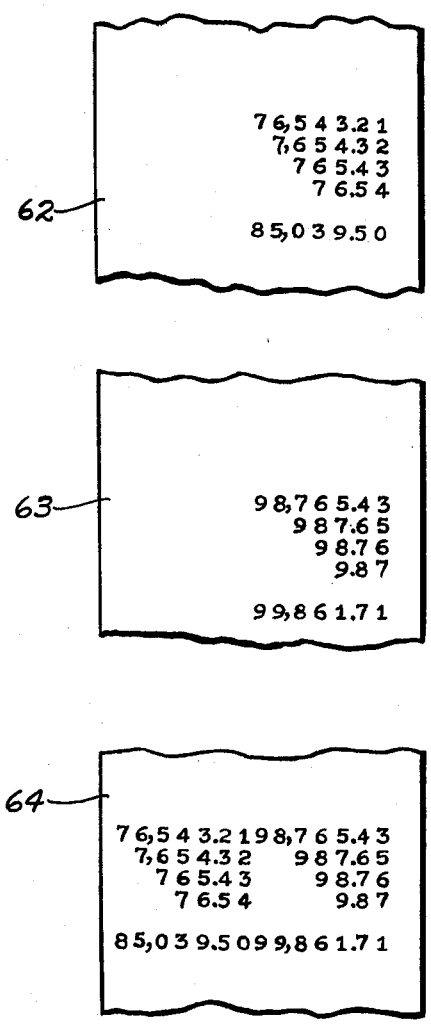
FIG. 2b shows sample listing tapes bearing trial balances printed in the accounting machine in accordance with a trial balance operation.

FIG. 2b shows three portions of tapes 62–64 with balances and trial balances printed thereon as located in the columnar position of accumulator 37. Tape 62 shows a trial balance of Balance #1 derived from successive documents fed and sensed. Tape 63 shows a trial balance of Balances #2 from successive documents. On tape 64 is shown a trial balance of Balances #1 and #2 taken simultaneously from successive documents.

Figure 3:
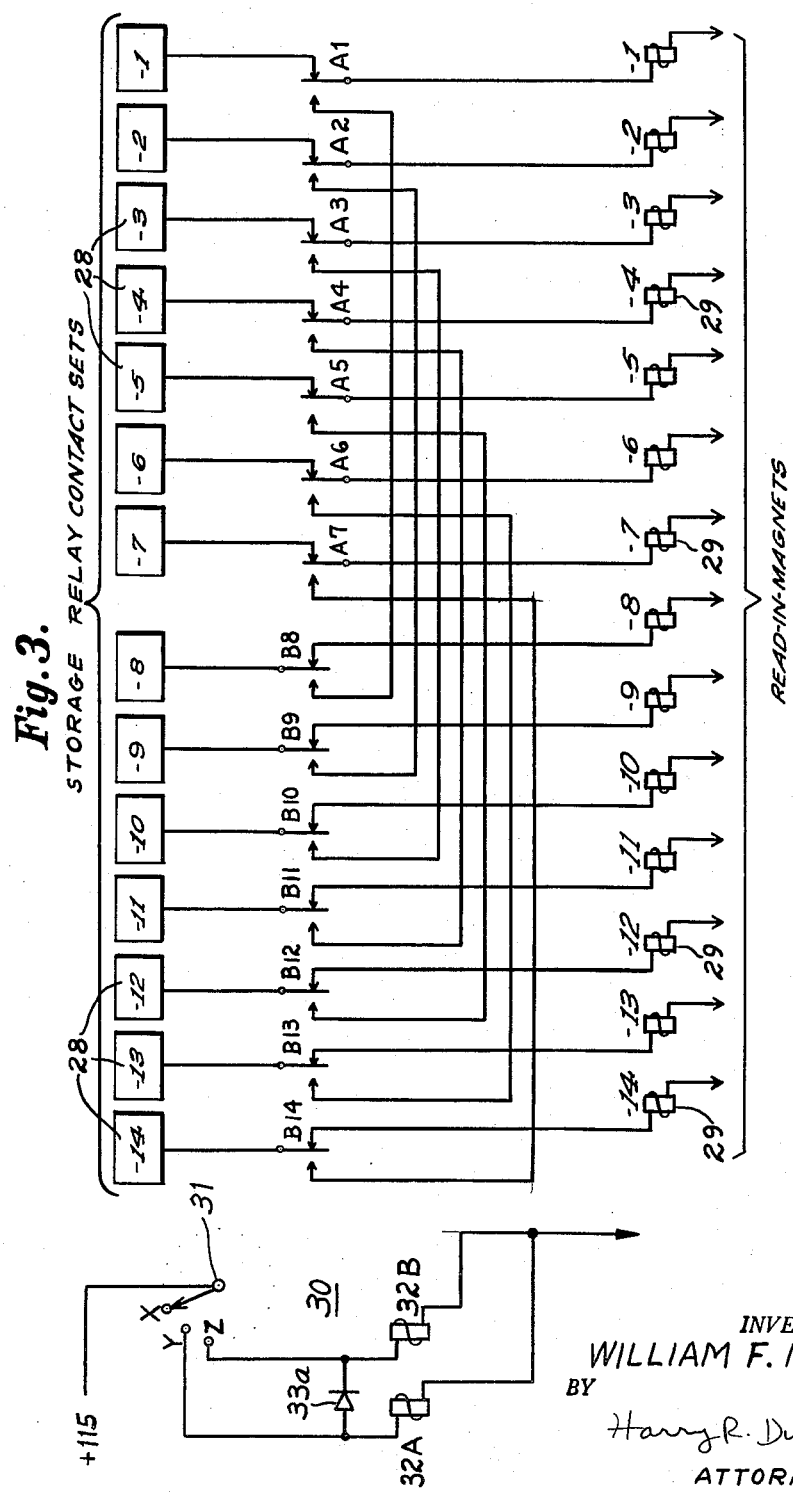
FIG. 3 shows a simplified schematic of the selective read-in control switch and circuitry as used, according to the present invention, to control data fed into the accounting machine read-in unit.

Referring to FIG. 3, a schematic is shown with a plurality of sets of contacts 28 of storage relays ordered according to the denominational order of the amount information received from the encoded documents. Each storage relay set is associated with and ordered according to the successive denominational orders of the amount information received from the encoded documents. In the aforementioned Deighton application Serial Number 598,454 in FIG. 1 13 sets of storage relays are shown which receive pulses from the Data Stripe only, temporarily store them, and later forward them to the read-in unit 25. Each of the contact sets 28 of FIG. 3 herein corresponds to a different set of whiffle tree contacts, shown separated by the dashed and dotted boundaries of FIG. 1 13 of the aforementioned Deighton application each of which sets of contacts terminates in or has extending therefrom a lead connected to one side of a different rack stop solenoid therein. With respect to the form of information storage relays employed in application S.N. 685,240, each of the contact sets 28 in FIG. 3 herein correspond to the contacts 16, 18 of a different set of information storage relays 72, 74 provided for each column of amount information therein each of which related columnar contact sets 16, 18 has a common lead 14 extending therefrom to one side of a different electromagnet 12 as illustrated in FIG. 1 therein.

Each of the storage relay contact sets 28 of FIG. 3 herein is associated with a different read-in solenoid or magnet 29, which corresponds to a rack stop solenoid of the aforementioned Deighton application or to an electromagnet 12 of application S.N. 685,240, and is connected thereto through the normally closed back contacts and the movable contacts A1 through A7 of a seven pole control relay 32A, which is associated with the first seven or lower denominational ordered storage relay contact sets 28–1 to 28–7, and to the movable contacts B8 to B14 and a normally closed back contact of another seven pole control relay 32B, which is associated with the remaining seven or the higher denominational ordered storage relay contact sets 28–8 to 28–14, the front or normally open contacts of control relay 32A being connected to the front or normally open contacts of control relay 32B as shown. When the system is normally operating and a balance is being read into the read-in unit 25 from the document or card 27, amount digits ordered one through fourteen will be read into data racks 33 as shown in FIG. 4 and thence read into the pinions 38 of accumulator 37 with printing if so programmed in the accounting machine.

Also shown in FIG. 3 is a control device herein shown as control circuit 30 including a manually settable switch 31 having three positions, X, Y, and Z, which is connected to a source of potential. Two electromagnets 32A and 32B control the engagement of movable contacts $A_1$ through $A_7$ and $B_8$ through $B_{14}$ with their respective right and left stationary contacts. A semi-conductor diode 33a is connected between electromagnets 32A and 32B.

Shown in FIG. 4 are certain components of the basic accounting machine including one of the plurality of data racks 33, transversely arrayed in the accounting machine, each of which is differentially positioned by a solenoid 29 and its associated clapper 53 which are a part of the read-in unit 25. Also shown is a portion of the storage means for numerical values shown as accumulator 37 with a pair of accumulator pinions 38 aligned beneath a second plurality of notches 39 in the lower edge of data rack 33. Thus, as the rack 33 makes its excursion forward in the accounting machine during its operating cycle to take a differential position representing a numerical value determined by the read-in unit 25, the digit will be stored into the appropriate pinion 38 of the accumulator 37. Also shown in part is the printing apparatus associated with the basic machine and including gear 49 and type rack 50 as controlled by a plurality of notches 51 in the lower edge of data rack 33.

FIG. 5 shows a portion of the rotary read-in 25 employed in the accounting machine. Solenoid 29 has an escapement 52 which is actuated by its clapper 53. The escapement operatively engages the teeth of a ratchet wheel 54 so as to rotate the ratchet wheel one tooth or step each time the solenoid 29 is pulsed. A pinion wheel 55 is provided for and engages each ratchet wheel 54. As each ratchet wheel 54 is rotated its respective pinion is also rotated and hence displaced arcuately a number of teeth or steps equal to the number of pulses applied to the solenoid. The pinion 55 is adapted to engage the toothed portion of its respective rack 33 and thereby control the entry of the digital amount into the accumulator 37. The manner of operation of the read-in unit 25 is discussed fully in the aforementioned Deighton application Serial No. 685,240.

*Description of Operation*

A document 27 bearing bits of information recorded on two magnetically energized data and complement stripes 56 and 57, is advanced and fed beneath the reading head 14 of the reading and feeding mechanism 11. The bits of information contained thereon represent in addition to the plus or minus sign and the account number, an amount of fourteen digits which represents a prior recorded balance or plurality of balances. As an example of a specific problem to be considered, we will discuss a share and loan transaction of the type encountered by credit union operations where the maintenance of two balances for loan and share is required. Both balances will be stored on the magnetic stripes of the document— the loan balance in the first 7 digits and the share in the second 7 digits. Both balances must be either plus or minus since mixed balances cannot be handled in a single accumulator of the accounting machine. If both balances are automatically read into the machine from a plurality of documents, it is apparent that the capacity of either side of the accumulator 37 may soon be exceeded. Therefore in some applications it is desirable to read either balance independently to obtain a trial balance of either the loan or share balances read.

First, we will consider making a trial balance of both balances, together which may be possible, for example, where the individual balances use up only three or four of the seven columns provided for each and a trial balance cannot reasonably be expected to exceed the 7 column capacity provided for each in the accumulator 37 of the accounting machine 12. The read and feed mechanism 11 commences scanning the data and complement stripe bits in conformance with the control of the start read switch 17 shown in FIG. 1. Data pulses pass through the amplifying units 20, pulse shaper 22 and complement pulses pass through amplifier 21 and clock element 24. Both data and complement pulses then are fed as a series of successive evenly spaced clock pulses to the clock portion of the stepping switches 23 to advance the stepper switches through their range of operation, the data pulses being distributed through the stepper switches for the selective energization of the information storage relays in sets 28 in accordance with the information encoded on the documents. From this temporary storage unit 24a with its storage relay contact sets 28 there extend fourteen leads which carry the digital information into fourteen read-in solenoids 29 of the read-in unit 25. When switch 31 of control circuit 30 is placed in the X position or "all" position, neither electromagnet 32A nor 32B is energized. Therefore, movable contacts $B_8$ through $B_{14}$ and $A_1$ through $A_7$ remain in their normal position against their respective rightwardly located stationary contacts and electrical pulse information flows normally from the fourteen storage relay sets into the fourteen read-in means shown as solenoids 29 which control the differential position of respective ones of the data racks 33 of the accounting machine in accordance with the digital value of the pulses received, when the accounting machine is cycled upon completion of a successful pulse checking operation, as previously described. The amount of the balance is also read into the pinions 38 of the accumulator 37 during data rack movement forwardly in the accounting machine through the notches 39 of rack 33. After the balance information from a successively fed group of cards has been read into the accumulator 37 of the accounting machine during a trial balance run, a total may be taken of the balances stored therein. The trial balance is taken with the carriage in a certain carriage position and under control of a Carriage position response Control Unit with appropriate control projections as described in the aforementioned Patent Number 2,629,549. The total may be manually initiated under manual control, as from a total and motoring key, without any lateral shifting of the carriage.

Next we shall consider an operation where the individual balances, loan and share, are already of seven digits each and it is clear that a trial balance from several documents will exceed the capacity of the single accumulator available for storage of these balances. While the present application considers an equal division of the number of digits available in the accumulator, it is readily apparent that the division may easily be varied by control circuit 30 to make a 6–8 split, a 5–9 split or any other division of the fourteen digits. To read the two balances separately all ledger cards 27 bearing balances are run through the read and feed mechanism twice. On the first reading as shown in FIG. 3, the switch 31 of control circuit 30 is placed in the Y position thereby energizing electromagnets 32A and 32B and causing movable contacts $A_1$ through $A_7$ and $B_8$ through $B_{14}$ to move in contact with their respective left located stationary contacts. Thus the information flow of amount digits from the second group of storage relay sets through movable contacts will pass into the first seven read-in solenoids 29 counting from the right. Thence, as best shown in FIG. 5, the digital information will be transferred by read-in unit 25 into differential positioning of racks 33 and their respective pinions 38 in the first seven columnar positions of accumulator 37. The remaining seven columns will be available for a total capacity of fourteen columns in the accumulator for a trial balance of share balances.

On the second run to obtain a trial balance of the loan balances, after the total for the first trial balance run of the share balances has been printed out clearing or normalizing the accumulator, the switch 31 of control circuit 30 is placed in the Z position thereby energizing electromagnet 32B only. Thus the information from the first group of seven storage relay sets through movable contacts $A_1$–$A_7$ will pass into the first seven read-in solenoids 29, and thence be transferred as hereinbefore described into the first seven columnar positions of accumulator 37 on the right side thereof. Once again the remaining seven columns will be available for a total capacity of fourteen columns in the accumulator for the trial balance of loan balances.

In an accounting system of the type herein considered the information sensed from the encoded document is stored in an accumulator allotted to the receipt of such information. In trial balance operations, where information on a plurality of documents or cards is successively sensed and then stored in the same accumulator and subsequently totaled out, it is apparent that, unless the size of the accumulator is greatly increased, its capacity will soon be exceeded where two or more active balances are sensed from each document. By incorporation of the present invention it is possible to enable the accounting machine to read either balance independently or to read both balances together into a single accumulator. In applications of the accounting system using only a single balance, the full capacity of the accumulator is made available for storage.

What is claimed is:

1. Accounting apparatus for processing magnetically striped ledger cards having single or multiple balance amount information of different classifications magnetically encoded thereon, said system including magnetic sensing means for sensing and converting magnetically encoded information into representative electrical signals, means for feeding a ledger card past said magnetic sensing means, a plurality of denominationally ordered sets of information storage relays receiving electrical signals converted by said sensing means from a ledger card fed thereby, electrical read-in means including a solenoid for each denominationally ordered set of information storage relays from which information is transferred to corresponding read-in solenoids, and a multiple position control means establishing in a first control position thereof electrical circuit connections between each denominationally ordered set of information storage relays and its corresponding denominationally ordered read-in solenoid whereby balance information in all of the information storage relay sets is transferred to all of the read-in solenoids for processing ledger cards having a single balance amount encoded thereon, said control means establishing in a second control position thereof electrical circuit connections between a first group of successive lower denominationally ordered sets of information storage relays less than the total number of sets of information storage relays and a similar numerically constituted first group of corresponding denominationally ordered read-in solenoids while disconnecting circuit connections between the remaining sets of information storage relays and read-in solenoids for processing ledger cards having multiple balance amounts thereon all of which are sensed by said sensing means but only one of which balance amounts is transferred from the first group of information storage relay sets connected to said first group of read-in solenoids, said control means in a third control position thereof establishing electrical circuit connections between a second group of successive higher denominationally ordered sets of information storage relays and said first group of read-in solenoids while disconnecting circuit connections between the remaining sets of information storage relays including the said first group of information storage relay sets for processing multiple balance amount ledger cards on which a different one of the balance amounts is transferred from the second group of information storage relay sets to said first group of read-in solenoids.

2. Accounting apparatus for processing magnetically striped ledger cards having single or dual balance amount information of different classifications magnetically encoded thereon, said system including an accounting machine having a plural order series of differentially positionable actuators and accumulators cooperable with said actuators, magnetic sensing means for sensing and converting magnetically encoded information into representative electrical signals, means for feeding a ledger card past said magnetic sensing means, electrical information storage means including a plurality of denominationally ordered sets of information storage relays receiving electrical signals converted by said sensing means from a ledger card fed thereby, electrical read-in means controlled by and receiving information transferred from said information storage means for controlling the differential positioning of said accounting machine actuators in accordance with the information sensed by said sensing means and stored in said information storage means, said electrical read-in means including a read-in solenoid for each denominationally ordered set of information storage relays, and a multiple position control means establishing in a first control position thereof electrical circuit connections between each denominationally ordered set of information storage relays and its corresponding denominationally ordered read-in solenoid whereby balance information in all of the information storage relay sets is transferred to all of the read-in solenoids for processing ledger cards having a single balance amount encoded thereon, said control means establishing in a second control position thereof electrical circuit connections between a first group of successive lower denominationally ordered sets of information storage relays less than the total number of sets of information storage relays and a similar numerically constituted first group of corresponding denominationally ordered read-in solenoids while disconnecting circuit connections between the remaining sets of information storage relays and read-in solenoids for processing ledger cards having dual balance amounts thereon both of which are sensed by said sensing means but only one of which balance amounts is transferred from the first group of information storage relay sets connected to said first group of read-in solenoids, said control means in a third control position thereof establishing electrical circuit connections between a second group of successive higher denominationally ordered sets of information storage relays and said first group of read-in solenoids while disconnecting circuit connections between the remaining sets of information storage relays including the said first group of information storage relay sets for processing dual balance amount ledger cards on which the other balance amount is transferred from the second group of information storage relay sets to said first group of read-in solenoids.

3. Apparatus for processing magnetically striped ledger cards having single or multiple balance amount information of different classifications magnetically encoded thereon, said apparatus including a form separating and feeding device receiving a stack of record members therein for separating and feeding a record member along a predetermined path and magnetic sensing means in the path of a fed record member for sensing and converting magnetically encoded information thereon into representative electrical signals, an accounting machine having a plural order series of differentially positionable actuators and accumulators cooperable with said actuators, electrical information storage means including a plurality of denominationally ordered sets of information storage relays receiving electrical signals converted by said sensing means from a ledger card fed thereby, electrical read-in means controlled by and receiving information transferred from said information storage means for controlling the differential positioning of said accounting machine actuators in accordance with the information sensed by said sensing means and stored in said storage means, said electrical read-in means including a solenoid for each denominationally ordered set of information storage relays, and a multiple position control means establishing in a first control position thereof electrical circuit connections between each denominationally ordered set of information storage relays and its corresponding denominationally ordered read-in solenoid for processing ledger cards having a single balance amount encoded thereon and information in all of the information storage relay sets is transferred to all of the read-in solenoids, said control means establishing in a second control position thereof electrical circuit connections between a first group of successive lower denominationally ordered sets of information storage relays less than the total number of sets of information storage relays and a similar numerically constituted first group of corresponding denominationally ordered read-in solenoids while disconnecting circuit connections between the remaining sets of information storage relays and read-in solenoids for processing ledger cards having multiple balance amounts thereon both of which are sensed by said sensing means but only one of which balance amounts is transferred from the first group of information storage relay sets connected to said first group of read-in solenoids, said control means in a third control position thereof establishing electrical circuit connections between a second group of successive higher denominationally ordered sets of information storage relays and said first group of read-in solenoids while disconnecting circuit connections between the remaining sets of information storage relays including the said first group of information storage relay sets for processing multiple balance amount ledger cards on which a different one of the balance amounts is transferred from the second group of information storage relay sets to said first group of read-in solenoids.

4. Apparatus for processing magnetically striped ledger cards having single or dual balance amount information of different classifications magnetically encoded thereon, said apparatus including a form separating and feeding device receiving a stack of record members therein for separating and feeding a record member therefrom along a predetermined path and magnetic sensing means in the path of a fed record member for sensing and converting magnetically encoded information thereon into representative electrical signals, an accounting machine remote from and electrically coupled to said form feeding and separating device, said accounting machine having a plural order series of differentially positionable actuators and accumulators cooperable with said actuators, electrical information storage means including a plurality of denominationally ordered sets of information storage relays receiving electrical signals converted by said sensing means from a ledger card fed thereby, electrical read-in means controlled by and receiving information transferred from said information storage means for controlling the differential positioning of said accounting machine actuators in accordance with the information sensed by said sensing means and stored in said storage means, said electrical read-in means including a solenoid for each denominationally ordered set of information storage relays, and a manually operable multiple position selector switch and control means establishing in a first control position thereof electrical circuit connections between each denominationally ordered set of information storage relays and its corresponding denominationally ordered read-in solenoids for processing ledger cards having a single balance amount encoded thereon and information in all of the information storage relay sets is transferred to all of the read-in solenoids, said control means establishing in a second control position thereof electrical circuit connections between a first group of successive lower denominationally ordered sets of information storage relays less than the total number of sets of information storage relays and a similar numerically constituted first group of corresponding denominationally ordered read-in solenoids while disconnecting circuit connections between the remaining sets of information storage relays and read-in solenoids for processing ledger cards having dual balance amounts thereon both of which are sensed by said sensing means but only one of which balance amounts is transferred from the first group of information storage relay sets connected to said first group of read-in solenoids, said control means in a third control position thereof establishing electrical circuit connections between a second group of successive higher denominationally ordered sets of information storage relays and said first group of read-in solenoids while disconnecting circuit connections between the remaining sets of information storage relays including the said first group of information storage relay sets for processing dual balance amount ledger cards on which the other one of the balance amounts is transferred from the second group of information storage relay sets to said first group of read-in solenoids.

References Cited in the file of this patent
UNITED STATES PATENTS

| | | |
|---|---|---|
| 2,750,113 | Coleman | June 12, 1956 |
| 2,884,189 | Palmer | Apr. 28, 1959 |
| 2,962,211 | Ghertman et al. | Nov. 29, 1962 |

FOREIGN PATENTS

| | | |
|---|---|---|
| 786,046 | Great Britain | Nov. 13, 1957 |